No. 632,036. Patented Aug. 29, 1899.
F. H. AUBEUF.
THILL COUPLING.
(Application filed Jan. 23, 1899.)
(No Model.)
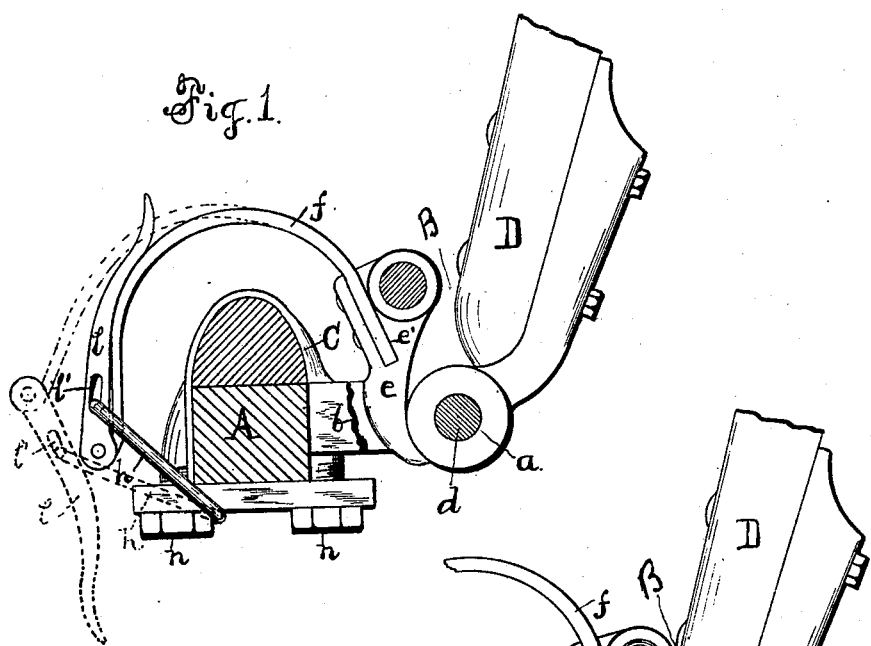
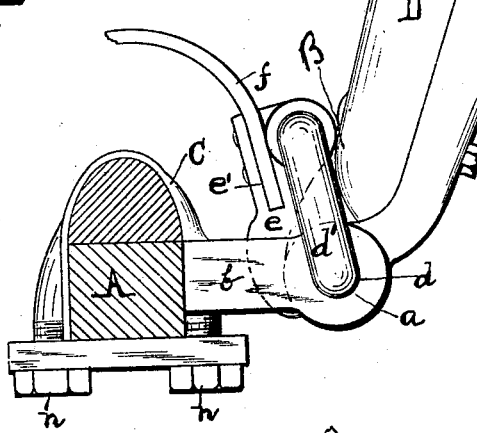
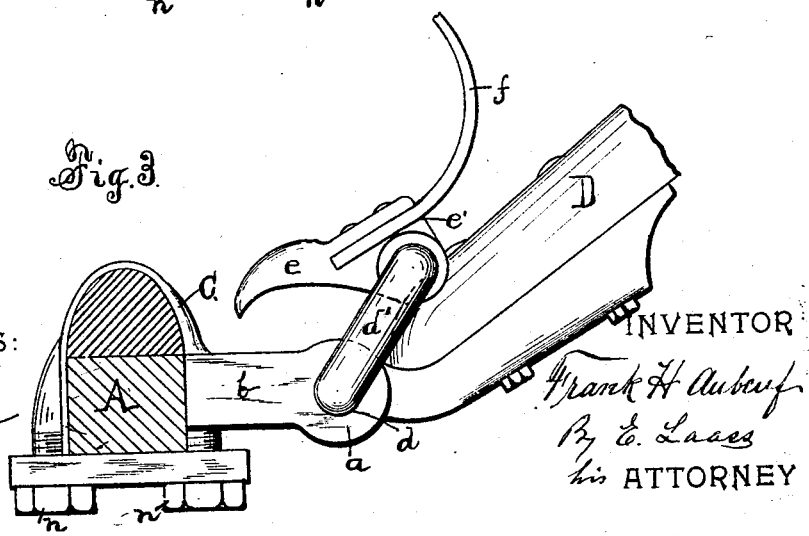
WITNESSES:
H. B. Smith.
B. J. Laas
INVENTOR
Frank H Aubeuf
By E. Laas
his ATTORNEY

UNITED STATES PATENT OFFICE.

FRANK H. AUBEUF, OF ONEIDA, NEW YORK, ASSIGNOR OF ONE-HALF TO EUGENE P. AUBEUF, OF SAME PLACE.

THILL-COUPLING.

SPECIFICATION forming part of Letters Patent No. 632,036, dated August 29, 1899.

Application filed January 23, 1899. Serial No. 703,048. (No model.)

*To all whom it may concern:*

Be it known that I, FRANK H. AUBEUF, a citizen of the United States, and a resident of Oneida, in the county of Madison, in the State of New York, have invented new and useful Improvements in Thill-Couplings, of which the following, taken in connection with the accompanying drawings, is a full, clear, and exact description.
This invention relates to the species of thill-couplings in which a wedge is carried to and from the space between the shackle-ears and retained therein by a spring connected at one end to the wedge and at the opposite end to a lever suspended from the axle-clip and locking the spring. Such couplings have proved to be dangerous owing to the construction and arrangement of the component parts allowing the coupling-pin to accidentally slip out of the coupling-eye of the thill-iron in case the spring or its locking devices are broken or otherwise disabled.

The object of this invention is to effectually prevent such accidental withdrawal of the coupling-pin from the coupling-eye of the thill-iron while the horse is hitched to the vehicle; and to that end the invention consists in the novel construction and combination of parts constituting a safety-coupling, as hereinafter described.

In the annexed drawings, Figure 1 is a side view of my improved thill-coupling, showing the thill in its position when the horse is hitched thereto. A portion of one of the shackle-ears is broken away to show the coupling-eye of the thill-iron and the operation of the wedge bearing on said eye. Fig. 2 shows the same with the spring broken and illustrates the safety of the coupling in case of such accidental breakage, and Fig. 3 shows the coupling in position for detaching the thills from the vehicle.

Similar letters of reference indicate corresponding parts.

A denotes the front axle of the vehicle, and D represents one of the thills, which has affixed to it the usual thill-iron, formed with the eye $a$, by which it is coupled to the vehicle.

C represents the usual clip, which embraces the axle and is formed with the forwardly-projecting shackle-ears $b$, which are perforated transversely for the reception of the coupling-pin $d$, which passes through said ears and intermediate coupling-eye $a$ when the thills are attached to the vehicle. The coupling-pin $d$ is formed at one end with an upwardly-extending guard $d'$, to the free upper end of which is pivoted the wedge $e$, which is thus suspended over the space between the two shackle-ears $b$ and in position to enter said space directly back of the coupling-eye $a$ of the thill-iron. To the upper portion of this wedge is secured a spring $f$, which extends upwardly therefrom and is thence bowed over the top of the axle and down at the rear of the axle, as represented in Fig. 1 of the drawings. To the free end of this spring is pivoted the lever $l$, on which is hung the link $h$, which is hooked at its free end onto one of the nuts $n$ of the axle-clip C when the thills are attached to the vehicle, as represented in Fig. 1.

In attaching the thills the coupling-eye $a$ of the thill-iron is introduced between the shackle-ears $b$, and then the coupling-pin $d$ is inserted into said ears and intermediate eye, while the free ends of the thills rest upon the ground or floor. In said operation the coupling-pin is turned so as to carry the wedge $e$ into the position shown in Fig. 3 of the drawings. Then said pin is turned back and the wedge $e$ is inserted back of the coupling-eye $a$, and then the link $h$ is hooked onto the nut $n$ and the lever $l$ is swung up and pressed forward onto the back of the spring $f$, and when in this position the lever is locked and caused to retain the wedge $e$ between the shackle-ears and press said wedge tightly against the back of the coupling-eye $a$, so as to effectually prevent said eye from rattling when the vehicle is in motion.

When the vehicle is in use, the thills stand in such a position as to cause the rear ends of the thills to rise abruptly from over the coupling and in such a proximity to the upper part of the wedge $e$ as to form by the back of the thill a barrier B, which prevents said wedge from slipping up and out from between the shackle-ears $b$ in case the spring $f$ is broken or the link $h$ has become accidentally unhooked from the nut $n$ or otherwise disabled, as illustrated in Fig. 2 of the drawings.

Hence I obtain a perfect safety thill-coupling which at the same time affords the advantages of permitting the thills to be quickly attached and detached when desired and effectually prevents the coupling from rattling when the vehicle is in use.

In order to facilitate the operation of hooking the link $h$ onto the nut $n$, I provide the lever $l$ with a longitudinal slot $l'$, in which the said link is pivoted. Said slot allows the link to slide lengthwise of the lever and to a position which causes the link to extend nearly horizontal from the lever in hooking said link onto the nut, as represented by dotted lines in Fig. 1 of the drawings. In swinging the lever up to its locking position the link slides to the upper end of the slot $l'$ and is thus carried closer to the fulcrum of the lever, and the manipulation of the lever is facilitated and its efficiency is augmented.

The wedge $e$ I prefer to form with a slot $e'$ in its upper end portion, and into said slot I insert the end of the spring $f$, which I fasten therein by a rivet passing through said portion of the wedge and spring.

What I caim as my invention is—

The combination, with the axle-clip provided with shackle-ears and the thill-iron provided with the coupling-eye, of a safety-coupling consisting of the coupling-pin formed with a guard extending upward from the end of said pin, a wedge suspended from the upper end of said guard, a spring attached at one end to said wedge and extending over the top of the axle-clip and down at the rear thereof, a lever pivoted to the free end of said spring, a link connected to said lever and hooked onto one of the nuts of the axle-clip, and the thill formed with a barrier in front of the top portion of the aforesaid wedge to prevent accidental withdrawal of the wedge from the shackle-ears as set forth.

FRANK H. AUBEUF. [L. S.]

Witnesses:
T. F. HAND, Jr.,
J. A. BABCOCK.